3,017,714
METHOD OF MAKING PLASTIC TERRAZZO AND RESULTANT PRODUCT
David K. Slosberg, Yardley, and Edward Nakonieczny, Philadelphia, Pa., assignors to Bonafide Mills, Inc., Winthrop, Maine, a corporation of Maine
No Drawing. Filed Nov. 7, 1958, Ser. No. 772,414
6 Claims. (Cl. 41—17)

This invention relates to a novel method of producing a plastic sheet having the appearance of terrazzo.

Terrazzo, which consists of marble chips in randomly distributed patterns, is well known for its beautiful appearance. Many attempts have been made to simulate these patterns using synthetic processes and plastic chips. However, the irregularity of the pattern of terrazzo and the striking cellular delineation of each marble chip has not been heretofore achieved. Instead of standing out as irregular bodies scattered randomly throughout the body of the material, the plastic chips appeared to blend with each other thereby preventing any faithful simulation of terrazzo.

It is therefore an object of the present invention to provide a novel terrazzo-like plastic sheet which effectively simulates the appearance of terrazzo.

Another object of the present invention is to provide a novel method for producing a terrazzo-like plastic sheet having the cellular grain boundary or etched appearance of terrazzo.

A further object of the present invention is to provide a terrazzo-like plastic sheet in which the cellular boundaries between the chips extends in depth throughout the sheet from one side to the other.

Still another object of the present invention is to provide a terrazzo-like plastic sheet having great resiliency and capable of being provided with highly decorative colors.

A feature of the present invention is the provision of a plastic sheet in which each of the plastic chips stands out and appears to be separately bonded to its adjacent chips.

A further feature of the present invention is the provision of a terrazzo-like plastic sheet which is very durable but is nevertheless not costly to manufacture nor difficult to produce.

Other objects and advantages appear in the following description and specification.

In providing the plastic sheet of the present invention, the initial step comprises producing irregular sized chips which contain polyvinyl chloride resins.

It is not necessary, in order to achieve the advantages of the present invention, to substantially deviate from the heretofore known method of initially producing the basic plastic chip itself. This method includes the steps of mixing the ingredients as, for example, the polyvinyl chloride resins, pigments and other adjuvants, as desired, in the presence of heat. The materials are formed into continuous sheets by processing through rollers. Irregularly shaped solid bodies or chips are then produced from the sheets.

Conventionally, after the plastic chips were produced, selected colors and sizes thereof were randomly distributed in a mold and cured to provide the so-called imitation terrazzo material.

According to the present invention, however, the plastic chips are subjected to a new and novel process which ultimately results in the provision of highly desirable grain boundary or etched effects throughout the plastic sheet. The chips are separated from each other by partitions of irregular shape. It has been found that this appearance of natural terrazzo is imparted to the synthetic sheet by providing a coating over substantially the entire surface area of each of the chips prior to molding them together.

The compatibility of the coating material with the ingredients of the plastic chips is such that a bond therebetween, sufficient to make the sheet entirely integral, will occur under molding conditions of heat and pressure. However, in further accordance with this invention, the coating material is of such nature that in the final product it resembles a honeycomb of cells, whereby each chip in the sheet appears separated from its adjacent chips and provides a completely delineating etched effect. Compositions containing polyvinyl chloride or copolymers containing vinyl chloride have been discovered to be extremely effective for use as such coatings for the plastic chips.

The polyvinyl chloride resins exemplarily employed in the coating material are hereinafter specifically identified by their relative, specific, or intrinsic viscosities.

Auxiliary agents may be included in the coating composition. For example, a plasticizer may be used. Exemplary of appropriate plasticizers are: dialkyl phthalates in which the alkyl esterifying radical contains 4 to 10 carbon atoms; esters of dicarboxylic acids such as azelaic acid, sebacic acid, adipic acid or the like; the hydrocarbon esters of phosphoric acid; and the epoxy polymers, such as epoxidized soybean oil. Specifically, exemplary of the plasticizers are butyl benzyl phthalate, butyl octyl phthalate, di-isodecyl phthalate, tri-cresyl phosphate and tri-octyl phosphate.

In order to prevent adverse reactions such as oxidation from taking place, the coating compositions may also contain stabilizers, as for example, the barium, zinc, lead, tin and cadmium salts of fatty acids containing 6 to 24 carbon atoms; dibutyl tin dilaurate; tin mercaptides and dibasic lead phosphite.

To facilitate the application of the coating to the chips a lubricant may be incorporated with the coating material. Lubricants which may be used include paraffin wax, stearic acid, stearates of lead, calcium, zinc and aluminum, coal tar resins, wood resin derivatives and others.

If colors are desired the coating material may also be pigmented with either an organic or inorganic pigment of any desired color.

For use on certain plastic chips, filler ingredients may be added to the coating. These increments include for example, calcium carbonate, calcium sulfate, magnesium silicate, aluminum silicate and others. It is to be understood, however, that such ingredients are not essential and when used, the amount of polyvinyl chloride and plasticizer utilized in the coating composition is lessened, varying in proportion to the amount of the filler used.

The coating composition may be produced either as dry powder, liquid, plastic or pulverized material. Thus in coating the chips virtually any method of application may be successfully utilized providing substantially the entire surface area of the chip is covered by the coating. It will be understood that for each of the different methods of applying the coating, it has been found desirable to vary the specific details and proportions of the ingredients of the composition to make it practical of application. Therefore, the following examples, which encompass specific compositions for each application technique, are not to be construed as in any way limiting the extent of this discovery. Instead, these compositions are only exemplary of certain formulae for producing coating which may be readily applied to the chips.

The coating for the plastic chips, according to the present invention, comprises polyvinyl chloride or copolymers containing vinyl chloride. The presence of vinyl chloride in the copolymer renders the composition compatible with the plastic chips.

The plastic chips can be coated in various ways. Examples, thereof, are as follows:

The dry blending method, viz., preparing the coating in powder form and tumbling or agitating the chips in a mass thereof until the coating is applied;

The plastisol method, viz., preparing the coating as a plastisol dispersion and thereafter immersing, spraying or otherwise subjecting the chips to application of the coating;

The pulverized compound method, viz., preparing the coating material in block or solid form and then reducing the same to powder by a pulverizing operation. The material is then applied to the chips by tumbling or agitating the chips in the coating material;

The organosol method, viz., preparing the coating as a dispersion which is less viscous than the aforesaid plastisol dispersion and subjecting the chips to the application thereof; or The solution method, viz., preparing a solution of the coating composition and applying the same by spray or immersion techniques over the surface of the chips.

Of course, any other suitable manner of application may be used. In using the particular methods set forth the preferable compositions are as follows:

The dry blending method

In using this technique, measured on a weight basis, the ingredients of the coating composition may comprise from about 55% to 98% polyvinyl chloride resin, from none to about 40% plasticizers, from about 1% to 3% stabilizer, from none to about 1% lubricant, pigment as desired and from none to about 60% filler ingredients (if desired).

A specific example of the coating composition used in the dry blending method is as follows:

|  | Percent |
|---|---|
| Polyvinyl chloride resin, relative viscosity 2.25 (1% solution in cyclohexanone at 25° C.) | 73.50 |
| Butyl benzyl phthalate | 10.50 |
| Di-isodecyl phthalate | 10.00 |
| Epoxidized soy bean oil (oxirane oxygen 5.8–7 and iodine number .3–1.0) | 3.75 |
| Barium/cadmium salts of long chain fatty acids | 2.25 |
| Pigment, as desired. | |

The plastisol method

In utilizing this method, the coating composition, on a weight basis, may comprise from about 25% to 45% polyvinyl chloride resin, from about 25% to 60% of a copolymer of vinyl chloride-vinylidene chloride, from about 6% to 40% plasticizers, from about 1% to 3% stabilizer, from about .5% to 3% lubricant, pigment as desired and from none to about 25% filler ingredients (if desired).

A specific example of the coating composition for the plastisol method is:

|  | Percent |
|---|---|
| Polyvinyl chloride resin-average specific viscosity about .60 (.4% solution in nitrobenzine at 20° C.) | 37.00 |
| Copolymer of vinyl chloride-vinylidene chloride, average specific viscosity about .38–.42 (.4% solution in nitrobenzine at 20° C.) | 36.67 |
| Di-isodecyl phthalate | 21.33 |
| Epoxidized tall oil (oxirane oxygen 3.0–5.0 and iodine number 1.0–5.0) | 3.33 |
| Barium/cadmium salts of long chain fatty acids | 1.67 |
| Pigment, as desired. | |

The pulverized compound method

In the use of this technique, the coating composition is first prepared in block, sheet or slab form. Thereafter by sanding, pulverizing or similar methods the block is reduced to powder form. It is thereafter applied to the chips by agitation of the chips in a bed of such powder or by any other suitable method which will cover substantially the entire surface area of the chips with a coating of the powder.

The coating composition, on a weight basis, may comprise from about 20% to 95% polyvinyl chloride resin, from about 10% to 45% plasticizer, from about 25% to 3% stabilizer, from about .5% to 3% lubricant, pigment as desired and from none to 70% filler (if desired).

An effective composition for use in this method is as follows:

|  | Percent |
|---|---|
| Polyvinyl chloride resin, relative viscosity 2.00 (1% solution in cyclohexanone at 25° C.) | 30.00 |
| Di(2-ethyl hexyl) phthalate (dioctyl phthalate) | 10.00 |
| Epoxidized soy bean oil (oxirane oxygen 5.8–7 and iodine number .3–1.0) | 3.00 |
| Barium/cadmium salts of long chain fatty acids | 1.00 |
| Zinc salts of long chain fatty acids | .50 |
| Stearic acid | .50 |
| Calcium carbonate | 35.00 |
| Clay | 30.00 |
| Pigment, as desired. | |

The organosol method

In the use of the organosol method the coating composition is first prepared and then thinned in an organic solvent such as naphtha, di-isobutyl ketone or any similar solvent.

The coating composition itself, on a weight basis, comprises from about 50% to 80% of polyvinyl chloride, from about 6% to 40% plasticizers, from about 1% to 3% stabilizer, from about .25% to 3% lubricant, pigment as desired and from about none to 25% filler ingredients (if desired). The resultant composition is thereafter thinned in a solvent, which on a weight basis comprises 12% to 35% of the total dispersion.

A specific example of the coating material is as follows:

|  | Percent |
|---|---|
| Polyvinyl chloride resin, average specific viscosity about .60 (.4% solution in nitrobenzine at 20° C.) | 73.00 |
| Di-isodecyl phthalate | 21.33 |
| Epoxidized soy bean oil (oxirane oxygen 5.8–7 and iodine number .3 to 1.0) | 4.00 |
| Dibutyl tin dilaurate | 1.67 |
| Pigment, as desired. | |

Thereafter, the compound is thinned with naphtha, for example, in such quantities as to make the final dispersion comprise 85% composition and 15% naphtha.

The solution method

A solvent is employed in the coating compound used in this method to maintain the resin composition in solution. The solvents employed may be ketones such as methyl ethyl ketone and methyl isobutyl ketone, or xylene, toluene, nitro paraffins or tetrahydrofuran. The solvents are used to provide the flow characteristics to the coating composition whereby the surface area of the chips are substantially and adequately covered therewith.

The liquid coating composition, on a weight basis, may comprise from about 18% to 25% copolymer resin such as polyvinyl chloride-acetate copolymer, which has an intrinsic viscosity of .24% to .79% (in cyclohexanone at 20° C.), from none to 10% plasticizer, from 0.12 to 1.5% lubricant and from 35% to 80% solvents.

A specific example of this coating composition is as follows:

| | Percent |
|---|---|
| Polyvinyl chloride-acetate copolymer, intrinsic viscosity .53 (in cyclohexanone at 20° C.) | 22.00 |
| Di(2 ethyl hexyl) phthalate (dioctyl phthalate) | 2.00 |
| Epoxidized tall oil (oxirane oxygen 3.0–5.0 and iodine number 1.0–5.0) | .50 |
| Barium/cadmium salts of long chain fatty acids | .25 |
| Methyl ethyl ketone | 50.00 |
| Toluene | 25.25 |

The coating composition is applied in such quantity as to cover substantially the entire surface area of the chip. The preferable amount of the coating composition, by weight thereof based upon the weight of the plastic chips, varies according to the aforesaid application methods employed, as follows:

In the dry blending method, 3% to 15% coating material;

In the plastisol method, 10% to 50% coating material;

In the pulverized compound method, 3% to 15% coating material;

In the organosol method, 5% to 30% coating material without solvent weight (non-volatile);

In the solution method, 2% to 10% coating material without solvent weight (non-volatile).

The chips prepared by the aforesaid organosol and solution methods are then processed to remove the solvent by, for example, passing them through a forced air drier. In these processes the coating may be fused to the chips prior to the ensuing molding operation.

The plastic chips which are provided with the coating composition are then molded or cured. This operation takes place under heat and pressure conditions sufficient to fuse both the chips and the coating material thereby producing an integral plastic sheet of the desired thickness.

The molding conditions may vary in heat from 250° to 350° F., and from a pressure of about 50 pounds per square inch in, for example, a continuous curing operation to 3,000 pounds per square inch in, for example, an hydraulic press operation. The pressure also depends upon the type of compound and the temperature conditions used in the molding operation.

To produce a sheet of ½ inch thickness from, for example, the chips coated by the dry blending method set forth above, the molding operation takes place in about 5 to 7 minutes under pressure of about 1500 pounds per square inch, and heat of 320° F. As another example, chips coated by the solution method will provide a sheet of ½ inch thickness at a temperature of 330° F. under pressure of 200 pounds per square inch for about 10 minutes. The type of chips employed, the coating composition, the work area conditions and the desired thickness of the resultant sheet determine the molding factors. When the chips and the coating composition are fused, there is provided an integral plastic sheet.

The sheet provided after the molding operation however does not have the outward appearance of terrazzo and does not present the partitioned etched effect. The faithful simulation of terrazzo only becomes apparent after the outermost surface of the sheet is removed when the details of the honeycomb of cells provided by the coating material around the interfitting chips are unexpectedly revealed. This unforeseen result is accomplished by, for example, a sanding operation on the surface of the sheet or the surface may be removed by knife slitters to expose the inner portions.

If desired, the thickness of the sheet or slab may be reduced by cutting operations. In any event, the portion of the sheet exposed ase hereinbefore set forth is thereafter polished.

A sheet which very effectively simulates terrazzo is then presented, having, as it does, the etched effect provided by the honeycomb of cells whose partitions extend in depth from one side of the sheet to the other. The sheet may then be processed as to the size necessary for its ultimate use, as for example, floor tile, wall tile, table tops, or for any other desired purpose.

While the invention and the compositions and methods of application have been described in great detail, it will be understood that scope of the invention is not to be considered in any way limited thereby. Variations and modifications may therefore be made without departing from the spirit of the invention or the scope of the appended claims.

We claim:

1. A plastic sheet formed to present a surface for display, said sheet comprising throughout a cellular structure of individual elements of solid chips of a vinyl polymer that are deformed under heat and pressure so that said elements are separated each from others by a separate and distinct hairline border structure comprised of a vinyl compound, said elements and border structures being visibly exposed at the display surface and extending in depth in the sheet, and said border structure being common to contiguous elements and forming a sharp delineation between said elements, whereby the appearance of the display surface closely resembles terrazzo.

2. A plastic sheet according to claim 1, characterized by the fact that said elements are of varied and substantial dimensions and the width of the border structure is sufficient merely to provide a visible delineation between said elements.

3. A plastic sheet according to claim 1, wherein said elements are of varied and substantial dimensions and irregular in size and shape and the width of border structure is sufficient merely to provide a visible delineation between said elements, whereby the relative dimensions of the border structure and said elements produces a sharp delineation of the outlines of said elements.

4. A plastic sheet formed to present a surface for display, said sheet being self-contained and comprising throughout a cellular structure of contiguous individual elements formed of solid chips of a vinyl polymer that are deformed under heat and pressure so that said elements are separated each from others by a relatively narrow border structure that outlines and extends between said elements and comprised of a vinyl compound, said elements and the border structure being visibly exposed at said display surface and extending therefrom for a substantial distance through the thickness of the sheet, and said border structure comprising a substantially continuous network of lines running linearly throughout the sheet and sharply defining the outline of each of said elements, whereby the appearance of the display surface closely resembles terrazzo.

5. The method of producing a plastic sheet having a surface which resembles terrazzo in appearance, which comprises the steps of covering solid chips of a material comprising a vinyl polymer with a thin coating of a vinyl compound, applying pressure to a mass of said coated chips to reduce them to sheet form, heating said sheet while maintaining it under pressure until said chips under the influence of said heat and said pressure have been deformed and said chips and said coating have bonded together to form an integrated substantially self-supporting sheet, and then removing the coating from one surface of the sheet to expose the surfaces of the chips which were covered by said removed coating.

6. The method of producing a plastic sheet having a surface which resembles terrazzo in appearance, which comprises the steps of covering solid chips of a material comprising a vinyl polymer with a thin coating of a vinyl compound, applying pressure to a mass of said coated chips to reduce them to sheet form, heating said sheet to a temperature in the range of 250° to 350° F. while under a pressure in the range of 50 to 3000 p.s.i. until said chips under the influence of said heat and said pressure have been deformed and said chips and said coating have bonded together to form an integrated substantially self-supporting sheet, and then removing the coating from one surface of the sheet to expose the surfaces of the chips which were covered by said removed coating.

References Cited in the file of this patent

UNITED STATES PATENTS

| | | |
|---|---|---|
| 1,305,621 | Prince | June 3, 1919 |
| 1,812,134 | Bragger et al. | June 30, 1931 |
| 2,631,355 | Craig | Mar. 17, 1944 |
| 2,729,770 | Robbins | Jan. 3, 1956 |
| 2,775,994 | Rowe | Jan. 1, 1957 |
| 2,835,996 | De Paoli | May 27, 1958 |
| 2,871,774 | Johnson | Feb. 3, 1959 |